United States Patent [19]

Tomich

[11] 4,159,656
[45] Jul. 3, 1979

[54] POSITIVE HOLD DIFFERENTIAL MECHANISM

[76] Inventor: Michael G. Tomich, 20519 Catalano Dr., Mt. Clemens, Mich. 48043

[21] Appl. No.: 850,404

[22] Filed: Nov. 10, 1977

Related U.S. Application Data

[63] Continuation-in-part of Ser. No. 668,473, Mar. 19, 1976, Pat. No. 4,104,931.

[51] Int. Cl.² .............................................. F16H 35/04
[52] U.S. Cl. ....................................................... 74/650
[58] Field of Search ........................................... 74/650

[56] References Cited

U.S. PATENT DOCUMENTS

| | | | |
|---|---|---|---|
| 2,231,968 | 2/1941 | Thornton | 74/650 |
| 2,329,075 | 9/1943 | Myers | 74/650 |
| 2,638,794 | 5/1953 | Knoblock | 74/650 |
| 2,667,087 | 1/1954 | Myers | 74/650 |
| 2,667,088 | 1/1954 | Myers | 74/650 |
| 2,830,466 | 4/1958 | Myers | 74/650 |
| 3,397,593 | 8/1968 | Knoblock | 74/650 |
| 3,791,238 | 2/1974 | Bokovoy | 74/650 |

OTHER PUBLICATIONS

*NoSpin & Tandem-Lock Differentials—Operation & Application*, A. A. Choma, S.A.E. Publication, Engr. & Opers. Meeting, Fort Wayne, Ind., Oct. 9–12, 1972, pp. 1–12.

*Operation NoSpin Differential Operating Manual*, Detroit Automotive, pp. 1–12, 1973.

*Primary Examiner*—Lance W. Chandler
*Attorney, Agent, or Firm*—Basile and Weintraub

[57] ABSTRACT

A positive locking differential mechanism that functions to compensate for the difference in driving wheel travel which occurs when turning or traveling over uneven ground, while at the same time functioning to prevent wheel-slip when one wheel loses traction. The differential comprises a spider and center cam assembly having a plurality of trunnions projecting radially from the spider. A plurality of fixed driving clutch teeth are disposed on each side of the spider. The internal diameter of the spider mounts the center cam in such a manner that the same may be rotated a limited, predetermined distance. The center cam is symmetric, having cam lifts on each side which include rounded surfaces that provide anti-friction ramps for disengaging driven clutch members mounted on each side of the spider and center cam assembly. The driven clutch members have clutch teeth which correspond to the clutch teeth of the spider and through which a driving torque is transmitted. The radially inward portions of the driven clutch teeth define disengaging cams which are adpated to mesh with the cams of the center cam member. Enlarged sections and corresponding slotted portions disposed between the clutch members and the spider-cam assembly at spaced intervals maintain the clutch members in a disengaged mode during relative movement between the clutch members and the spider-cam assembly.

6 Claims, 9 Drawing Figures

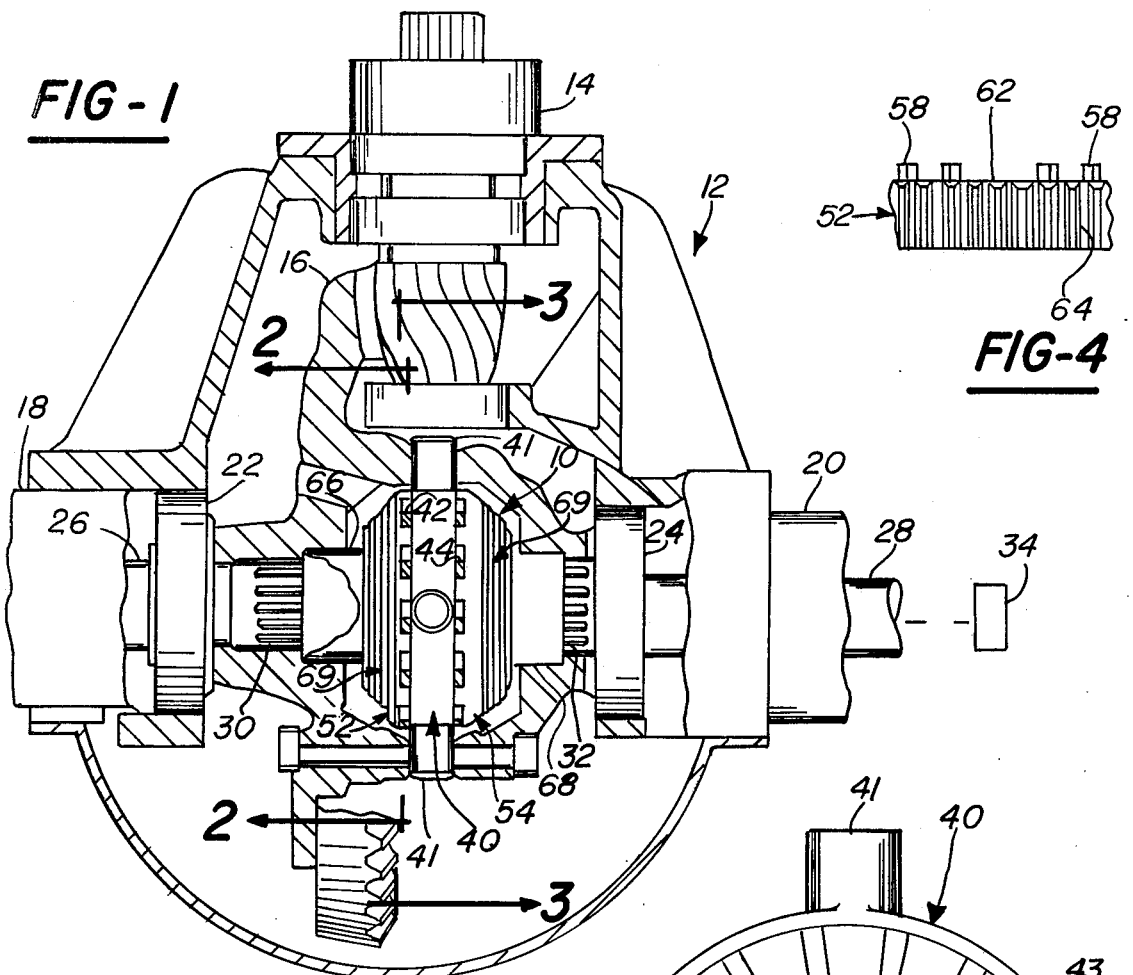
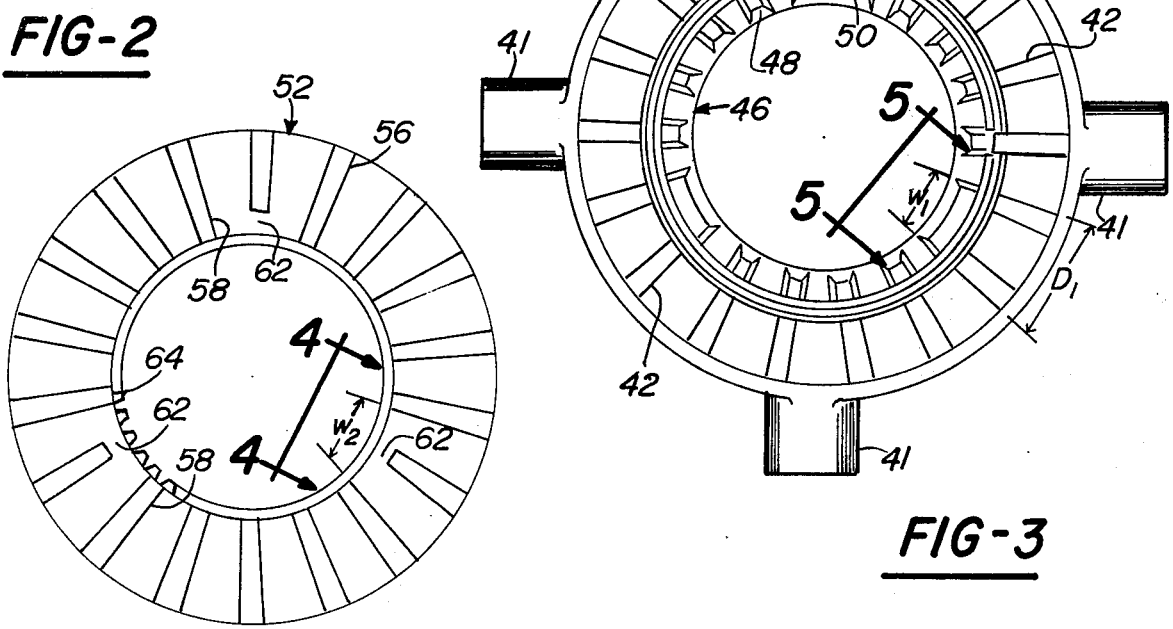

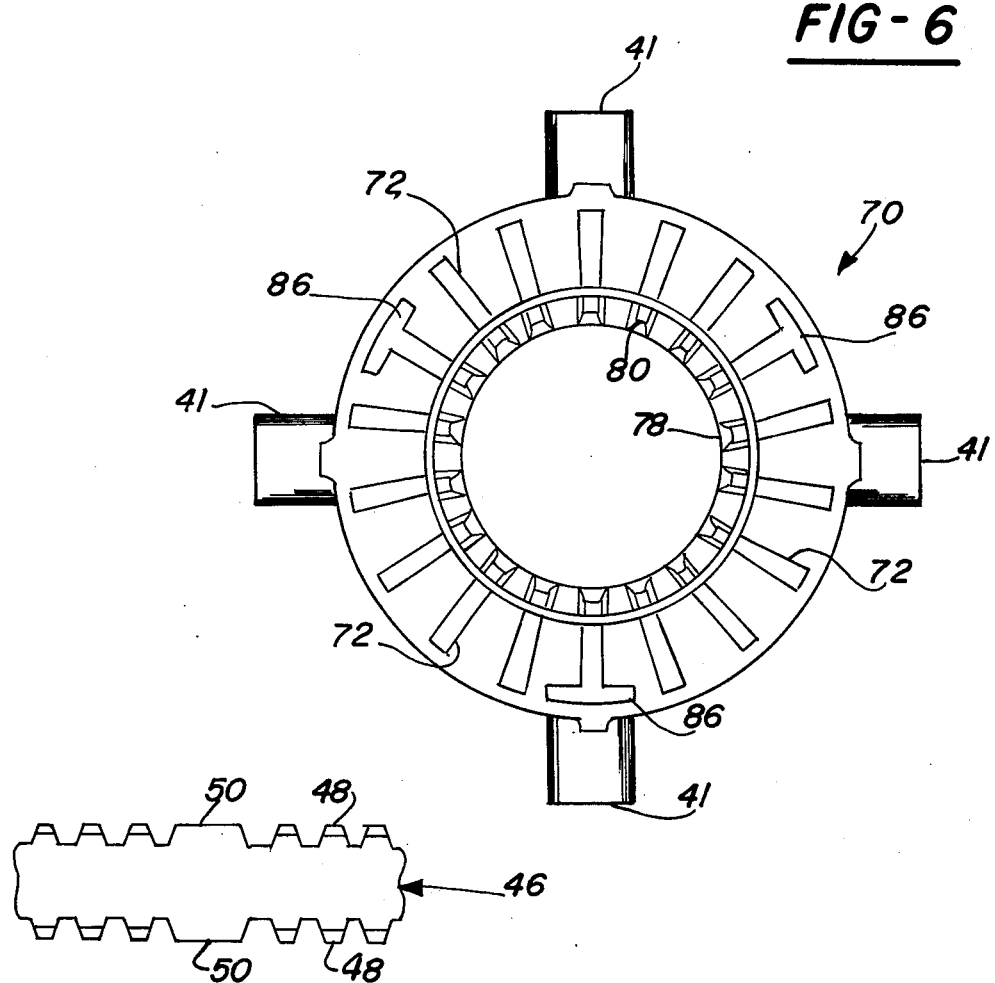
FIG-6
FIG-5
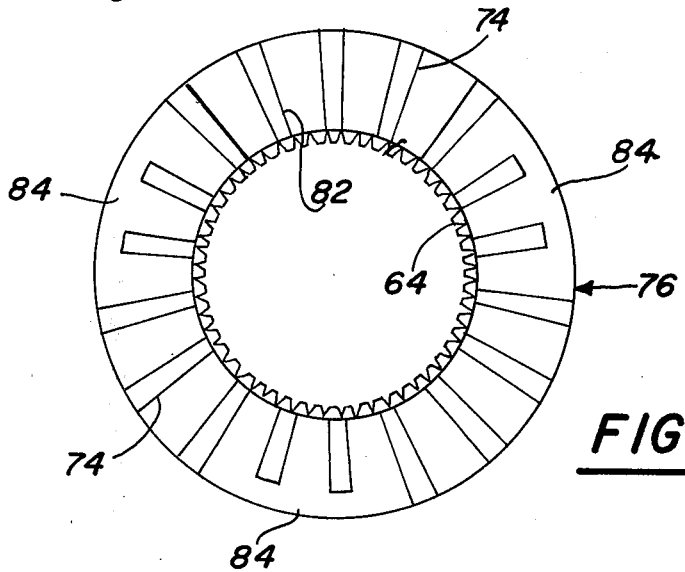
FIG-7

POSITIVE HOLD DIFFERENTIAL MECHANISM

CROSS REFERENCE TO RELATED APPLICATIONS

The present application is a continuation-in-part application of copending United States patent application Ser. No. 668,473 now U.S. Pat. No. 4,104,931 filed Mar. 19, 1976, by Michael G. Tomich for POSITIVE HOLD DIFFERENTIAL.

BACKGROUND OF THE INVENTION

I. Field of the Invention

The present invention relates to positive locking differentials for providing a positive drive to both wheels of a vehicle, while allowing differential action when required.

II. Description of the Prior Art

Many of the earliest mechanically driven vehicles were of the tri-wheel type with power and steering being provided to the single wheel, while the two remaining wheels were free to independently rotate on their axles as required when making turns. These designs were soon discarded in favor of the four-wheel type of vehicle which not only increased stability and improved appearances, but provided for a much better distribution of weight. The earlier four-wheeled vehicles had power transmitted to one wheel by means of a chain and sprocket arrangement, while the other rear wheel remained free to rotate independently on turns. The first practical installation of a bevel gear type differential permitted the four-wheel vehicle to be driven by two powered rear wheels, yet one wheel could rotate faster or slower than the other as required when turning corners or traveling on uneven surfaces; however, under certain conditions when one wheel slipped or lost traction, the other received little or no driving torque, thereby allowing the vehicle to stall. The development of modern-day power transmission units for driving axles of motor vehicles follows the same general design of operating characteristics used by their predecessors for the past 100 years. The present-day bevel gear differential remains the same except in size, material, specification and number of components. For many years attempts have been made to overcome the principal disadvantage of the conventional differential, that is, of one free spinning wheel permitting the vehicle to stall. Positive locking differentials have been devised for over-coming this problem and generally comprise a spider having fixed driving clutch teeth which are engageable with fixed teeth on a disengageable clutch. The clutch member disengages from the spider to over-run the same to accommodate a road condition or to negotiate a turn.

It can be seen that in the positive locking differential mechanism when turning a corner, the outside wheel must rotate faster than the inside wheel, otherwise serious tire scuffing would occur. When driving around a turn, the positive locking clutch driving the outside wheel is automatically disengaged, permitting the wheel to rotate freely until the turn is completed and the clutch is reengaged. When the turn is being made, there will be a series of clicking sounds resulting from the alternate disengagement and engagement of the differential clutch teeth on the outside clutch. These clicking sounds, which are quite audible on small trucks and pickups, represent a major disadvantage of the positive locking differential mechanism. This undesirable characteristic has been eliminated by means of the hold-out rings which are displaced by a key in the spider to a position between the fixed cams of the clutch members, thus preventing the clutch teeth from reengaging until the overriding cycle has been completed. Generally this consists of providing an axial groove in the teeth of the driven clutch into which the hold-out ring is snapped. The axial groove includes a slight under-cut, protruding radially inwardly at the bottom of the groove. Generally each hold-out ring is slotted and includes a shoulder protruding radially inwardly which locks into the under-cut groove of the clutch and includes a plurality of lugs protruding axially inwardly. When the clutch and hold-out ring are assembled to the spider and center cam assembly, the gaps between the ends of each hold-out ring mesh with the long spider key and the axial lugs mate with the center cam slots.

When a clutch and hold-out ring assembly is required to rotate faster to make a turn through the overriding action of one wheel, the clutch is free to ride up over the cams of the center cam, while the other clutch is held in a firm, locked engagement with the spider by the natural resistance of the slower wheel. After the wheel begins to rotate forward, the shoulder on one end of the slot and the right hold-out ring engage the spider key, locking it to the spider cam and setting its lugs ahead of the slot in the center cam. This prevents the driven cam from returning to engagement as long as it rotates faster than the spider and center cam assembly is being driven. When the overriding movement ceases and the relative speed of the spider and overriding clutch become the same, there is a slight reversal of torque so that the right hold-out ring rotates back from the spider key and its lug becomes realigned with the center cam slot, permitting the driven clutch and hold-out ring to return to full engagement with the spider center cam.

In a article, "No Spin and Tandem-Lock Differentials—Operations and Applications," by A. A. Choma, Society of Automotive Engineers No. 720904 presented at the National Commercial Vehicle Engineering and Operations meeting at Fort Wayne, Ind., on Oct. 9–12, 1972, it is indicated that automatic locking differentials are normally manufactured in three styles; namely, the standard type including individual cam indexing, the style and type including hold-out ring index control, and the silent overriding type including directional hold-out ring index control. The general operation of the standard and silent types is similar. As aforementioned, the driven clutch member disengages from the spider to override to accommodate a road condition or to negotiate a turn to the right or left in either forward or reverse directions. The standard type reengages after each clutch tooth, resulting in the aforementioned clicking or indexing sound. The silent type is equipped with hold-out ring cams which are displaced by the key in the spider to a position between the fixed cams of the clutch member, thus preventing the clutch teeth from reengaging until the overriding cycle has been completed. The silent, overriding type differential is for use in vehicles that may be particularly sensitive to the cycling action in the standard or silent type of automatic locking differentials when torque is reversed, such as over-hung engine, two-wheel tractors used in construction work. It is effective on vehicles having critical steering characteristics.

While the aforementioned positive locking differential has functioned well to eliminate the aforementioned disadvantages of noisy operation, the modified machining and additional components necessary to have the hold-out ring in each clutch on opposite sides of the spider represent a substantial cost in both labor and material. It would thus be advantageous and would represent a considerable improvement over the prior art if a positive locking differential mechanism of the type described were provided with the clutch overriding the spider teeth and being maintained in the overriding mode through a substantial degree of rotation without the necessity of the hold-out ring. In addition to the aforementioned publication of the Society of Automotive Engineers, additional prior art consists of U.S. Pat. Nos. 2,667,088; 2,667,087; 2,638,794; 2,231,968; 2,329,075; 2,830,466; 3,397,593; and 3,791,238; and the operation no-spin differential operating manuel published by Detroit Automotive, pages 1–12, 1973. These aforementioned patents and publication are relevant in that they are cited in the aforementioned copending United States patent application.

Prior Art Statement

The aforementioned prior art, in the opinion of the applicant and applicant's attorney, constitutes the closest prior art of which applicant and applicant's attorney are aware.

SUMMARY OF THE INVENTION

The present invention, which will be described subsequently in greater detail, comprises a positive locking differential mechanism having a spider with drive teeth mating with the driven teeth of a clutch member, wherein the drive line torque is proportional at each axle shaft when the axle shafts are turning at the same speed while differentiating during a power condition, wherein the slower running shaft maintains a drive torque to the ground and the faster running shaft (being ground driven) will cam out of engagement with the spider teeth until the two axles are synchronized. The clutch and spider cams are maintained in a non-engaging relationship during this overrun condition by means of a novel placement of enlarged projections and mating slotted portions disposed between the clutch members and the spider and center cam assembly.

Accordingly, it is a primary object of the present invention to provide a new and improved positive locking differential mechanism of the type described wherein the teeth of the spider are disengaged from the driven clutch teeth without the necessity for a hold-out ring.

It is a further object of the present invention to provide such a differential mechanism which can perform in a satisfactory manner for transmitting torque to the driven wheels of a vehicle, while permitting the wheels to move at different speeds relative to each other as is necessary to accommodate turning and variations in the road, the same being accomplished by a reduction of the components in the prior art devices without a corresponding reduction in performance and operation.

It is still a further object of the present invention to provide an improved differential mechanism including a central cam member mounted for limited rotation concentrically within the driving member for effecting axial displacement and disengagement of an overriding one of two driven clutch members arranged on opposite sides of the driving member, respectively, said cam and driven clutch members including a plurality of equally spaced indexing teeth and indexing spaces contained within the circular arrangement of cooperating cam teeth on the opposed faces thereof, respectively, thereby to reduce the number of indexing operations per revolution of the overriding driven clutch member relative to the driving member.

It is still a further object of the present invention to provide a differential mechanism of the type described herein which is less expensive to manufacture and more reliable in use.

Further objects, advantages and applications of the present invention will become apparent to those skilled in the art of positive locking differential mechanisms when the accompanying description of several examples of the best modes contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and in which:

FIG. 1 is a cross-sectional view through a differential carrier incorporating a positive locking differential mechanism constructed in accordance with the principles of the present invention;

FIG. 2 is a fragmentary, cross-sectional view through the positive locking differential mechanism taken along Line 2—2 of FIG. 1;

FIG. 3 is a fragmentary, sectional view through the positive locking differential mechanism taken along Line 3—3 of FIG. 1;

FIG. 4 is a fragmentary view of the positive locking differential mechanism as seen from Line 4—4 of FIG. 2;

FIG. 5 is a fragmentary, sectional view of the positive locking differential mechanism as seen from Line 5—5 of FIG. 3;

FIG. 6 is a fragmentary, sectional view of a positive locking differential mechanism similar to FIG. 3 illustrating a modification of the present invention;

FIG. 7 is a fragmentary, sectional view of a positive locking differential mechanism similar to FIG. 2 illustrating a modification of the present invention used in conjunction with the element illustrated in FIG. 6 of the drawings;

DESCRIPTION OF THE PREFERRED EMBODIMENTS

Figure 8:
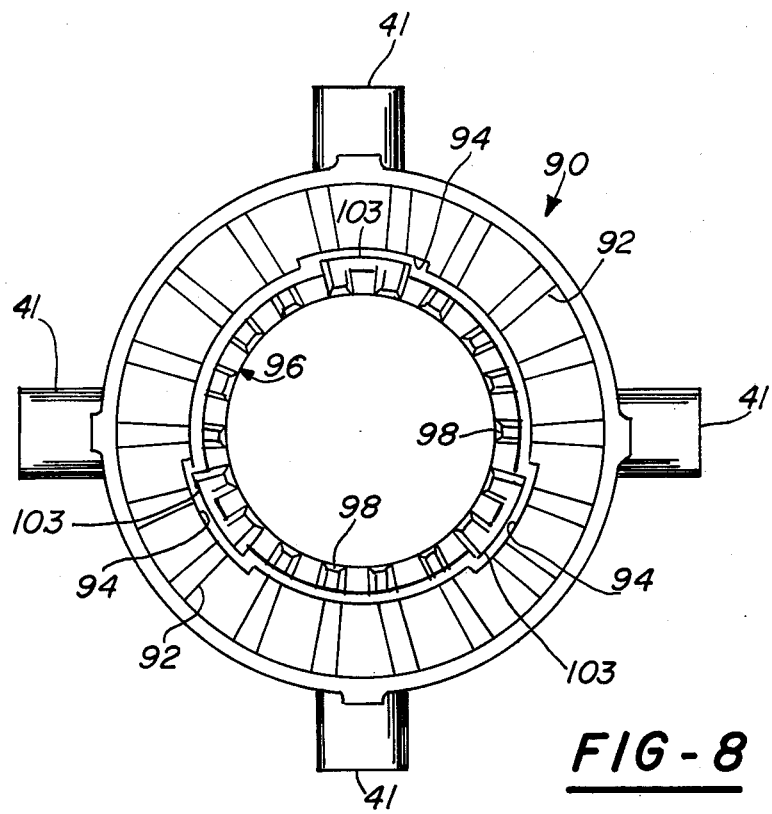
FIG. 8 is a fragmentary, sectional view of a positive locking differential mechanism similar to FIG. 3 of the drawings illustrating another modification of the present invention.

Referring now to the drawings and, in particular, to FIG. 1 wherein there is illustrated one example of the present invention in the form of a positive locking differential mechanism 10 mounted within a differential carrier 12. The differential carrier 12 is conventional in structure and includes a yoke 14 which is connected to the vehicle drive shaft through which power from the engine of the vehicle is transmitted via a drive pinion gear 16 to the positive locking differential mechanism 10 in a conventional manner. The differential carrier 12 further comprises left- and right-hand axle housings 18 and 20 which, respectively, mount tapered roller bearing assemblies 22 and 24. In the conventional manner a left axle shaft 26 extends through the axle housing 18 and is rotatably supported by the roller bearing assembly 22, while a right axle 28 extends through the axle housing 20 and is supported at its inner end by the roller bearing 24. The inner ends of the axles 26 and 28 are splined at 30 and 32, respectively, for engagement with the positive locking differential mechanism 10 in a manner which will be described hereinafter. The opposite ends of the shafts 26 and 28 terminate in a conventional manner for attachment to the vehicle wheels, one of which is schematically illustrated at 34. As aforementioned, a prime function of the positive locking differential mechanism 10 is to compensate for the differences in driving wheel travel which occurs when turning or when traveling over uneven ground. The other prime function of the differential mechanism 10 is to prevent wheel spin when one wheel loses traction, a condition which would stall a vehicle not equipped with a positive locking differential mechanism. This is because the positive locking differential mechanism prevents driving torque from forcing one wheel to rotate faster than its opposite wheel. When a vehicle is not being driven in a straight, forward direction, the clutch teeth, as will be described hereinafter, of the positive locking differential mechanism 10 are fully engaged and give both rear wheels driving torque. If one wheel should lose traction momentarily by rolling onto ice or snow over a soft shoulder of the road, the other wheel will still have traction and will continue to pull the vehicle until traction is regained by both wheels. In a normal operation when, for example, the right wheel passes over an obstruction or if the vehicle makes a left turn, the right wheel must travel faster and further than the left wheel. When this happens, the positive locking differential mechanism 10 functions to automatically allow for the difference in wheel travel in a manner which will be described hereinafter.

Referring to FIGS. 1 and 3 of the drawings, the input torque from the engine is transmitted through the differential carrier 12 to a spider 40 which, in turn, as can best be seen in FIG. 3, comprises four trunnions 41 projecting radially from a center ring 43 on each side of which is located a plurality of arcuately spaced, radially disposed, fixed drive teeth 42 and 44. Still referring to FIG. 3, the positive locking differential mechanism 10 further comprises a center cam 46 mounted inside the spider 40 and generally held in position by any suitable means, such as a snap ring (not shown), which permits the center cam 46 to be rotated a limited, predetermined distance within the spider 40, but prevents lateral movement. The center cam 46 is symmetric having nearly the same number of cam lifts 48 on each side as there are clutch teeth 42 and 44 on the spider 40, with the important exception of the arcuately enlarged cam lifts 50 (FIGS. 3 and 5). The cam lifts 50 are spaced at predetermined, arcuate distances, and in the embodiment illustrated in FIG. 3 of the drawings the enlarged cam lifts 50 are spaced at distances of 120° from one another. The cam lifts 50 and their manner of operation and function will be described in greater detail hereinafter. The cam lifts 48 and 50 have uniform contours with rounded surfaces that provide anti-friction ramps for disengaging a pair of driven clutch members 52 and 54. The driven clutch members 52 and 54 are identical and are located on opposite sides of the spider and center cam assembly. Each of the driven clutch members 52 and 54 has a set of arcuately spaced teeth 56 which match the clutch teeth 42 and 44 on the spider 40 and through which a driving torque is transmitted when the teeth 42 (and 44) and 56 are in driving contact. The radial inward portions of the driven clutch teeth 56 define clutch cams 58. The clutch cams 58, that is, the inward portions of the driven clutch teeth 56, are designed to mesh with the cams 48 formed on the center cam 46. The driven clutch member cams 58 have three arcuately spaced, enlarged, slotted portions 62 which are adapted to receive one of the enlarged cams 50 formed in the center cam 46 in a manner which will be described hereinafter. The internal diameter of each driven clutch member 52 and 54 has splines 64 which engage the external splines (not shown) of the spline side members 66 and 68. The two splined side members 66 and 68 are, in turn, internally splined to receive the axle shaft splines 30 and 32, respectively, and thus it can be seen that torque is transmitted from the spider 40 to the driven clutch members 52 and 54 and then to the axle shafts 26 and 28 via the spline connections of the splined side members 66 and 68. Suitable retainers and springs 69 are incorporated in the positive locking differential mechanism 10 to hold the driven clutch members 52 and 54 against the opposite sides of the spider 40.

It can be seen that the clutch teeth 42 of the spider 40 are engaged with the clutch member teeth 56 of the members 52 and 54 only when the cams 50 are axially aligned with the enlarged slot 62 formed on the clutch members 52 and 54 and the cams 50 are received within the enlarged slots 62.

A more detailed description of the operation of the inventive positive locking differential mechanism 10 will be described in greater detail hereinafter.

Referring now to FIGS. 6 and 7 for a description of a modification of the present invention in the form of a spider 70 having drive teeth 72 which are adapted to lockingly engage driven teeth 74 formed in a clutch member 76. The spider 70 has a center cam 78 provided with a plurality of uniformly sized and evenly spaced cam lifts 80 which are adapted to engage the lower portion of the driven teeth 74, said lower portion being referred to as the clutch cams 82. As can best be seen in FIG. 7, the clutch member 76 is provided with a plurality of arcuately spaced recesses 84 at selected arcuate locations along the outer edge of the clutch member driven teeth 74. The recesses 84 are formed by radially shortening adjacent pairs of driven teeth 74. The arcuate distances of the recesses 84 are such as to receive arcuately enlarged teeth 86 similarly spaced on the opposite sides of the face of the spider 70. The enlarged teeth 86 and the arcuately spaced recesses are preferably spaced 120° apart. It can thus be seen that a locking, driving engagement between the clutch member 76 and the spider 70 can be obtained only when the enlarged portions 86 of the spider 70 are in axial alignment with the enlarged recesses 84 of the clutch member 76. What is illustrated are three over-sized and equally spaced teeth on the spider and two consecutive teeth cut short on the clutch at three equally spaced intervals. It should be noted that the aforementioned may be reversed, thus having the three over-sized teeth formed on the clutch, while the three adjacent pairs of teeth are cut short on the spider.

Figure 9:
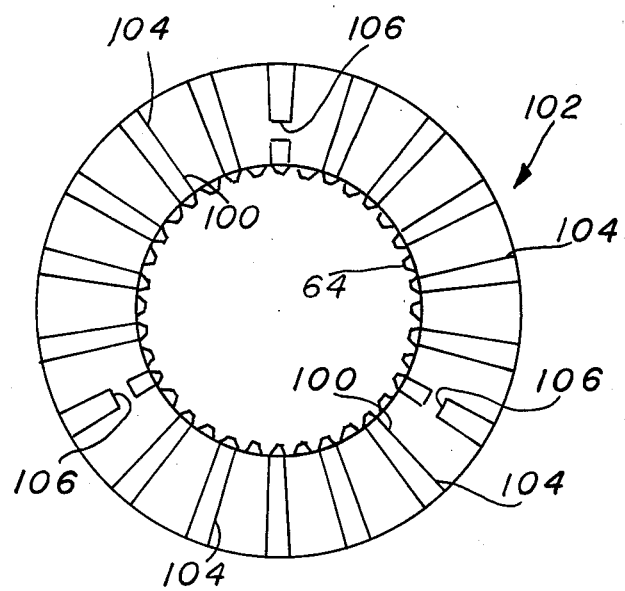
FIG. 9 is a fragmentary, sectional view of a positive locking differential mechanism similar to FIG. 2 of the drawings illustrating a modification of the invention used in conjunction with the element illustrated in FIG. 8 of the drawings.

Referring now to FIGS. 8 and 9, there is illustrated another modification of the present invention in the form of a spider 90 having a plurality of arcuately spaced drive teeth 92. Additionally, the spider teeth have inwardly formed recesses 94 spaced at predetermined locations along the inner diameter of the spider teeth 92 and preferably at 120° intervals. The spider 90 further comprises a center cam 96 which is provided with a plurality of evenly spaced and uniformly formed cam lifts 98 which function to engage correspondingly shaped and spaced cams 100 formed on the facing side of a clutch member 102. The center cam 96 includes a plurality of axially projecting and radially enlarged teeth 103 which correspond to the recesses 94 formed in the spider drive teeth 92. The clutch member 102 further comprises a plurality of driven teeth 104 which, in fact, are radial extenstions of the spaced cams 100. The driven teeth 104 are formed at spaced intervals along the facing side of the clutch member 102, and it is of particular importance that the slotted portions 106 are formed at intervals corresponding to the arcuate intervals between the enlarged teeth 94 on the spider 90. It can be seen that engagement between the drive teeth 92 of the spider and the driven teeth 104 of the clutch member 102 may occur only when the enlarged projections 103 of the spider 90 are axially aligned with the enlarged slotted portions 106 of the clutch member 102, the same occurring every 120° of relative movement of the two components.

In operation when a vehicle is being driven in a straight, forward direction, the clutch teeth on both sides of the spider assembly are fully engaged with the clutch teeth on each driven clutch member. Likewise, the fixed cams of the driven clutch members are fully matched with the cam surfaces of the center cam ring mounted on the inside diameter of the spider, as previously described. Engagement of the driving and driven clutch teeth is assured by the pressure of the springs 69 which force the driven clutch member inwardly against the spider and also by the positive locking action developed by the driving faces of the clutch teeth. In this condition both clutches remain fully engaged so that the assembly acts as a solid unit and each rear wheel is driven forward at the ring gear speed. When making a turn, differential action is required in order to permit the outside wheel to travel a greater distance and faster than the inside wheel. A conventional bevel gear type differential permits the outside wheel to turn faster than the ring gear speed, while the inside wheel turns slower than the ring gear speed. The positive locking differential mechanism 10 allows either wheel to turn faster than the ring gear speed but does not permit either wheel to turn slower than the ring gear speed when power is applied. When negotiating a right turn, for example, in a forward direction, the right-hand drive clutch member remains fully engaged with the spider clutch teeth and the corresponding cams of the center cam. The driving clutch teeth of the spider transmit the driving force to the driven clutch member which, in turn, drives the right-hand wheel constantly at ring gear speed, thus propelling the vehicle. The left-hand wheel covers a greater arc than the right-hand wheel and, driven by the traction of the road, must turn faster than the ring gear speed. Likewise, the left-hand driven clutch member must turn faster than the spider. In other words, the mechanism permits differences in wheel speeds or differential action. The right-hand cams on the center cam member are meshed securely with the cams on the right-hand drive member. When the center cam is locked in this position so that it cannot rotate with respect to the spider, its cams on the left-hand side serve as ramps upon which the mating cams on the left-hand driven clutch member can rise, enabling the driven clutch member to disengage from the spider. The ramps on the center cam are high enough to permit the clutch teeth on the driven clutch member to clear the teeth on the spider; and due to the enlarged size of the cams 50 on the center cam, the driven clutch member will remain disengaged from the spider teeth until the crest of the ramp of the enlarged portions passes the teeth of the driven clutch and is axially aligned with one of the enlarged slots 62, at which time the driven clutch member is forced back via the spring pressure into full engagement with the clutch teeth of the spider. Depending upon the size of the differential mechanism 10 in its particular application and, in particular, in off-road vehicles which employ a planetary gear reduction axle, engagement and disengagement occur only while there is a relative difference in the speed of the spider in the driven clutch member. As the vehicle completes the turn and is again driven in a straight, forward direction, the differential action is no longer required and both driven clutch members will become fully engaged as the enlarged teeth 50 are axially aligned with the enlarged slotted portions 62. It should be appreciated in the embodiment illustrated in FIGS. 6 through 9 that the operation is similar, but the driven clutch and the spiders will not come into engagement until the enlarged teeth 103 in the spider 90 (enlarged teeth 86 on the spider 70) are in axial alignment with the slotted portion 106 on the clutch member 102 (the slotted portion 84 on the clutch member 76).

Although a 120° interval between the oversized teeth 50 (or teeth 86 and 103) has been indicated as being preferred, in deciding the number of such oversized teeth 50 (or teeth 86 and 103) the actual application factors, such as tire size, planetary gear reduction, if any, axial deflection, engine horsepower, drive train ratio, turning radius, load capacity of the vehicle and terrain, should be considered. Thus, for example, in a 20-tooth arrangement, 90° intervals may be more appropriate for certain applications.

In accordance with the characterizing features of the present invention, a number of indexing teeth are provided in equally spaced relationship among the arrangement of cam teeth at each end of the cam member. In the illustrated embodiment of FIGS. 2 and 3, three indexing teeth are provided, each having a width (W1) which is equal to the distance (D1) between the remote side walls of a pair of successive cam teeth. Similarly, three indexing teeth are provided in equally spaced relationship among the cam teeth on each of the driven clutch members. The three indexing spaces have a width (W2) which corresponds with the width W1 of the indexing teeth. The driven member is provided with, preferably, 18 clutch teeth which cooperate with 18 corresponding clutch teeth on the driving member. The 15 cam teeth are radially aligned inwardly from the clutch teeth, and similarly the driven member is provided with 18 clutch teeth and 15 radially aligned cam teeth.

While several examples of applicant's invention have been disclosed, it should be understood by those skilled in the art of positive locking differential mechanisms that other forms of applicant's invention may be had, all coming within the spirit of the invention and scope of the appended claims.

What is claimed is as follows:

1. In a differential mechanism including an annular driving member, a pair of driven clutch members coaxially arranged at opposite ends of, and axially displaceable relative to, said driving member, respectively, the opposed faces of said driving and clutch members having interengaging clutch teeth, respectively, an annular center cam member arranged concentrically within, and connected for limited rotation relative to said driving member, the opposed faces of said center cam and clutch members having interengaging cam teeth, respectively, and means biasing said driven clutch members axially inwardly toward said driving member, thereby to normally effect engagement between said clutch teeth on said driving and driven clutch members, respectively, and between said cam teeth on said driven clutch and center cam members, respectively, said cam teeth having profile configurations and heights to cause, when one driven clutch member overruns the driving member, axial displacement and corresponding disengagement of the clutch teeth of said one driven clutch member; the improvement which comprises (a) means defining on one face of each pair of adjacent faces of said central cam and driven clutch members in equally spaced relation within the arrangement of cam teeth thereon a smaller number of indexing teeth, the width of each indexing tooth corresponding with the distance between the remote side surfaces of a given number of said cam teeth; and (b) means defining on the other face of each pair of adjacent faces in corresponding equally spaced relation within the arrangement of cam teeth thereon a number of indexing spaces corresponding with the number of indexing teeth, the width of each indexing space being at least as great as the width of each indexing tooth, whereby when the said one clutch member overruns the driving member, said clutch member is normally disengaged and is axially indexed into driven engagement with said driving member only when the indexing teeth are opposite the indexing spaces, respectively.

2. The apparatus as defined in claim 1 wherein said indexing teeth are arranged on said central cam member and wherein said indexing spaces are arranged on said driven clutch members, respectively.

3. The apparatus as defined in claim 2 wherein the central cam member includes at each end at least three equally circumferentially spaced indexing teeth.

4. The apparatus as defined in claim 1 wherein the width of each indexing tooth corresponds with the distance between the remote side surfaces of two successive cam teeth.

5. A differential mechanism for compensating for the difference in driving wheel travel, said mechanism comprising:

a spider member having a plurality of arcuately spaced drive teeth on opposite sides thereof;

a pair of clutch members sandwiching said spider member thereinbetween, said clutch members each having a plurality of driven teeth releaseably engageable with said spider drive teeth for transmitting torque from said spider member to said clutches;

a plurality of arcuately spaced first cams carried by said spider member;

a plurality of arcuately spaced second cams carried by each of said clutch members and axially aligned with said spider member cams for lifting sand clutch member teeth out of engagement with said spider member teeth to permit relative movement between said spider member and on of said clutch members; and a plurality of enlarged projections and mating enlarged slots carried between said spider member and clutch members for maintaining said relative movement between said spider member and one clutch member for an arcuate distance greater than the arcuate distance between adjacent spider member cams, said enlarged projections being of a one-piece construction with one of said members; wherein said projections are formed on said spider member in the form of a T-shape in a location adjacent the periphery of said spider, said slots being formed on said clutches adjacent the periphery thereof in axial alignment with said spider projections.

6. A differential mechanism for compensating for the difference in driving wheel travel, said mechanism comprising:

a spider member having a plurality of arcuately spaced drive teeth on opposite sides thereof;

a pair of clutch members sandwiching said spider member thereinbetween, said clutch members each having a plurality of driven teeth releasably engageable with said spider drive teeth for transmitting torque from said spider member to said clutches;

a plurality of arcuately spaced first cams carried by said spider member;

a plurality of arcuately spaced second cams carried by each of said clutch members and axially aligned with said spider member cams for lifting said clutch member teeth out of engagement with said spider member teeth to permit relative movement between said spider member and one of said clutch members; and a plurality of enlarged projections and mating enlarged slots carried between said spider member and clutch member for maintaining said relative movement between said spider member and one clutch member for an arcuate distance greater than the arcuate distance between adjacent spider member cams, said enlarged projections being of a one-piece construction with one of said members, wherein said projections are formed on said spider first cams and are radial extensions thereof, said slots being formed in association with said clutch cams in axial alignment with said spider projections.

* * * * *